Figure 1:
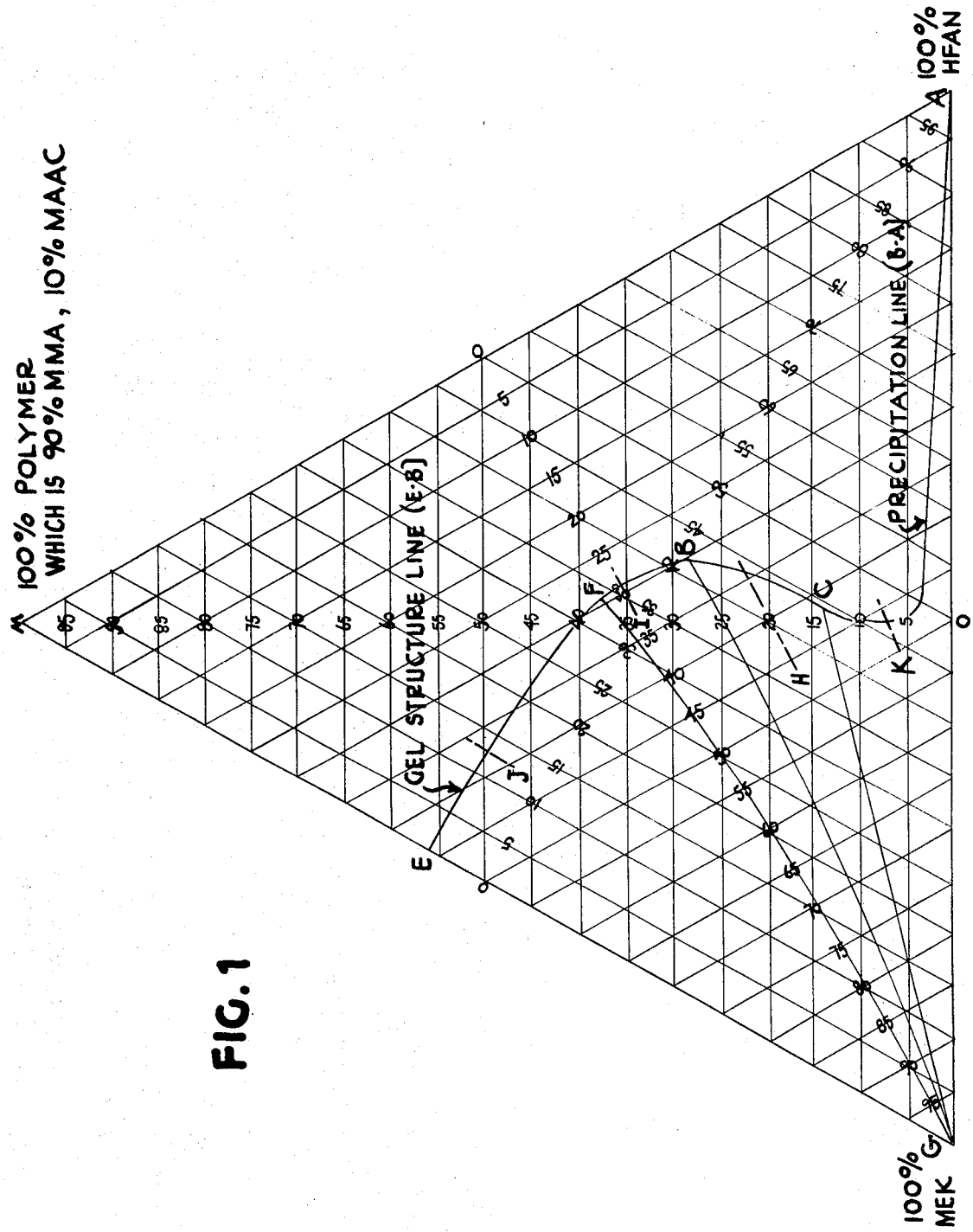

United States Patent [19]
Seiner

[11] 3,770,604
[45] Nov. 6, 1973

[54] ELECTRODEPOSITION OVER NON-CONDUCTIVE PRIMERS

[75] Inventor: Jerome A. Seiner, Pittsburgh, Pa.

[73] Assignee: PPG Industries, Inc., Pittsburgh, Pa.

[22] Filed: Jan. 2, 1970

[21] Appl. No.: 253

[52] U.S. Cl. .............................................. 204/181
[51] Int. Cl. .............................................. B01k 5/02
[58] Field of Search .................................. 204/181

[56] References Cited
UNITED STATES PATENTS

| | | | |
|---|---|---|---|
| 3,455,805 | 7/1969 | Smith et al. | 204/181 |
| 3,616,394 | 10/1971 | Koepke et al. | 204/181 |
| 3,424,663 | 1/1969 | Weigel | 204/181 |
| 3,497,376 | 2/1970 | Weiser | 204/181 |
| 3,506,555 | 4/1970 | Stadler et al. | 204/181 |

Primary Examiner—Howard S. Williams
Attorney—Chisholm and Spencer

[57] ABSTRACT

This invention relates to a novel two-coat coating system. Particularly, this invention relates to a method of electrodepositing an electrodepositable composition over a porous primer which need not be inherently conductive and to articles produced by this method.

9 Claims, 2 Drawing Figures

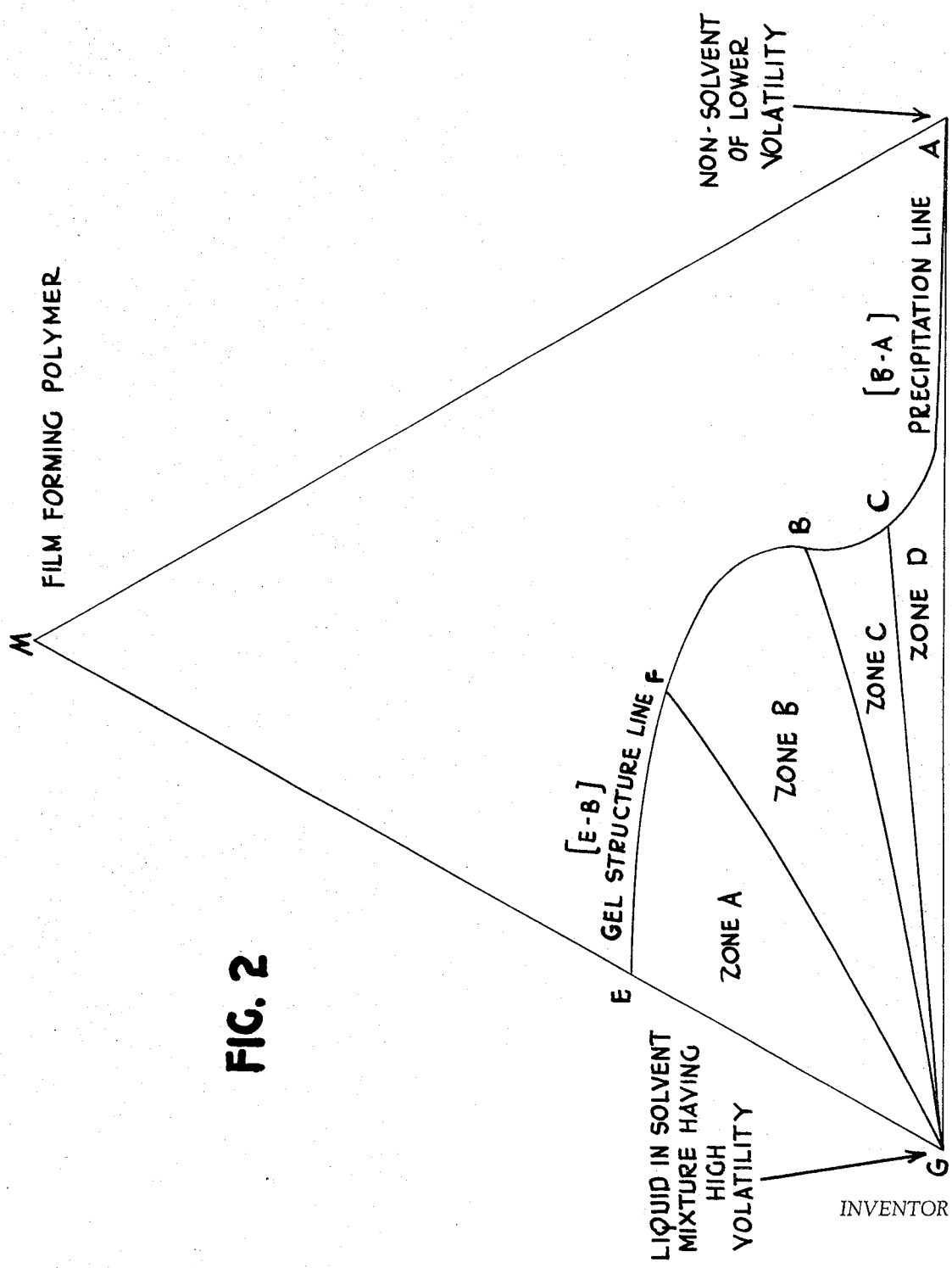

ELECTRODEPOSITION OVER NON-CONDUCTIVE PRIMERS

STATE OF THE ART

Electrodeposition has achieved wide industrial acceptance as a method of applying protective coatings. The coatings achieved have excellent properties for many applications and electrodeposition results in a coating which does not run or wash off during baking. Virtually any substrate may be coated by electrodeposition. Most commonly employed substrates include the base metals such as iron, steel, aluminum, copper, zinc, brass, tin, nickel, and chromium, as well as other metals or pretreated metals. Impregnated paper or other substrates rendered conductive under the conditions employed may also be coated.

Electrodeposition of certain materials, including waxes and synthetic resins have been known in the art for some time. Likewise, recent patents, for example, U. S. Pat. Nos. 3,320,162; 3,422,044; 3,369,983 and 3,403,088, described methods and compositions presently utilized in the field of automotive finish and industrial coatings.

While electrodeposition is in many respects advantageous compared to ordinary application techniques, there are inherent limitations in the system. Heretofore it has been considered that the substrate which is to be coated must be a conductive substrate, that is, a metal or a substrate which has been rendered electrically conductive; thus it has been assumed that conventional primers which are not inherently conductive may not be employed as primers under an electrodeposited film since electrodeposition over this primer would be impossible. Primers have been developed which, due to a high loading of metal filings or electrically conductive material, conduct sufficient electric current under the conditions of an electrodeposition bath to receive an electrodeposited top coat. However, due to the inherently high loading factor of conductive materials, the scope of materials useful and the properties of the resultant primer are limited. The conventional primer finds utility in providing adhesion to the substrate or innercoat adhesion as well as specific properties contributed by the primer film or primer components such as corrosion resistance. To be of utility as a primer under an electrodepositable composition, a primer, in addition to its ultimate coating properties, must be capable of conducting electric current under the conditions of the electrodeposition bath and thereby receiving an electrodeposited topcoat. An inherently non-conductive class of primers capable of receiving an electrodeposition top coat with broad formulation capabilities has heretofore not been known in the art.

DESCRIPTION OF THE INVENTION

It has now been found, and this discovery forms the basis of this invention, that a conductive substrate may be coated with an inherently non-conductive, microporous coating composition and that this coated article, in turn, may be coated by an electrodeposition process. Many advantages are derived from this process; for example, resins which have heretofore not been available in an electrodeposition coating system since the desired resin was not water-soluble and, therefore, could not be applied in an electrodeposition process may be applied to a substrate and then receive an electrodeposited top coating. Thus, combined film properties can be achieved which heretofore had been unattainable in an electrodeposition process. Likewise, ingredients, such as pigments, rust and corrosion inhibitors may be added to the microporous film, which would have a deleterious effect on the electrodeposition bath either since they lack ability to be coated from the bath or since they adversely affect the long-term stability of the bath composition.

The base or primer coats employed to form the coating compositions of this invention are porous, open-celled films which are permeable to water, that is, more specifically, films containing substantially interconnected voids, the film having at least about 10 percent void volume. Another method of expressing the primer or base coats of this invention is as a discontinuous film, that is, a film having a preponderance of interconnected open cells or breaks and having a Kubelka-Munk scattering coefficient greater than 0.5 reciprocal mil at 4400 angstroms and greater than 0.1 reciprocal mil at 5600 angstroms.

The Kubelka-Munk analysis is discussed in detail by J. B. Judd in "Color in Business, Science and Industry", John Wiley and Sons, New York (1952), pp. 314–338; and by D. B. Judd and G. Wyszecki in "Color in Business, Science and Industry", 2nd Edition, John Wiley and Sons, New York (1963), pp. 387–413, the disclosures of which are incorporated herein by reference.

The films which may be employed as primers for electrodeposition within the scope of this invention are not limited by the resin composition nor the manner in which the interconnecting voids are produced. Thus, virtually any porous, open-celled film which is permeable to water and is a film containing substantially interconnected voids and having at least about 10 percent void volume may be employed. A number of films and methods of their production are known in the art.

For example, U. S. Pat. No. 2,848,752 describes a method of preparing films of vinylidene-type organic polymers which are porous, opaque and non-fibrous. These are obtained by a process which involves (1) the preparation of an aqueous dispersion of a polymer containing, based on the weight of the dispersion, from 10 to 50 percent of a water-soluble organic solvent for the polymer, the solvent being one which boils above 100°C. and being present in a concentration that is insufficient to dissolve the polymer; (2) shaping the dispersion, preferably in the form of a film; (3) removing a substantial amount of aqueous media by evaporation from the film until the partial coalescence of the polymer occurs, as indicated by substantial clarification with tackiness; (4) washing the tacky structure with water, a liquid in which the polymer is insoluble, which dissolves the solvent from the polymer, to produce a coherent film substantially free from dissolved polymer, followed by (5) washing the resultant film free of organic solvent, after which the film is dried at a temperature below the softening point.

In U. S. Pat. No 2,806,256 there are described microporous films of uniform porosity which were produced by thoroughly dispersing a finely divided thermoplastic powder of controlled particle structure throughout a highly viscous, inert and incompatible medium which is maintained as a continuous phase. The dispersion is then heated to the fusion temperature of the thermoplastic particles to effect fusion thereof. The inert material is then leached out by a suitable solvent which will dissolve the inert material without dissolving or affecting the fused thermoplastic particles.

In U. S. Pat. No. 3,208,857 are disclosed numerous methods of preparing microporous coatings, including one method which comprises (a) applying to a substrate a layer of solution of polymer in an organic solvent; (b) bathing the layer with a mixture of an organic solvent for the polymer and a nonsolvent for the polymer that is at least partially miscible with said solvent until the layer is coagulated into a cellular structure of interconnected micropores, the solvent:nonsolvent weight ratio in said mixture being from about 10:90 to 95:5; (c) removing substantially all of the solvent from the layer; and (d) removing substantially all of the nonsolvent from the resulting substantially solvent-free microporous layer.

A preferred method of preparing the microporous films employed in the method of the invention are described in copending application Ser. No. 524,953, filed Feb. 1, 1966, now abandoned, the disclosure of which is incorporated herein by reference. This method comprises producing a continuous, opaque film containing interconnected, open cells or breaks by a process which comprises (a) applying to a substrate a composition comprising a film-forming gelable polymer and a solvent mixture for said film-forming material comprising at least two miscible liquids, at least one of said liquids being a non-solvent for said polymer and having a lower volatility than that of the other liquids in said mixture, the amount of said lower volatility non-solvent liquid present in said mixture being at least enough to produce, upon the removal of said solvent mixture from said composition, an open-celled film having a Kubelka-Munk scattering coefficient greater than 0.5 reciprocal mil at 4400 angstroms and greater than 0.1 reciprocal mil at 5600 angstroms, and less than that which, upon removal of said solvent mixture from said composition, produces a disparticulate film, i.e. a film comprising non-connected film particles and (b) removing the solvent mixture from the composition applied to said substrate.

The film-forming, gelable polymers which may be used in preparing these films are well known in the art. These include thermoplastic and thermosetting synthetic as well as natural polymers. The only limitations on the film-forming polymers are that they must be soluble in (i.e., miscible with) the particular solvent mixture used and they must be capable of gelling (i.e., being transformed from the liquid phase to the solid phase) upon evaporation of a portion of the solvent system.

Examples of film-forming, gelable polymeric materials which may be used to include cellulose derivatives (e.g., ethyl cellulose, nitrocellulose, cellulose acetate, cellulose propionate and cellulose acetate butyrate); acrylic resins (e.g., homopolymers and copolymers with each other or with other monomers of methyl acrylate, methyl methacrylate, ethyl acrylate, ethyl methacrylate, butyl acrylate, butyl methacrylate, acrylic acid and methacrylic acid); polyolefins (e.g., polyethylene and polypropylene); nylon; polycarbonates; polystyrene, copolymers of styrene and other vinyl monomers such as acrylonitrile; vinyl polymers such as homopolymers and copolymers of vinyl acetate, vinyl alcohol, vinyl chloride and vinyl butyral; homopolymers and copolymers of dienes such as polybutadiene, butadiene-styrene copolymers and butadiene-acrylonitrile copolymers. Condensation polymers may also be used, such as alkyd resins which are obtained by the condensation of a polyhydric alcohol and a polycarboxylic acid. Examples of polycarboxylic acids which may be used to form the alkyd resin include phthalic acid, phthalic anhydride, succinic acid, adipic acid, maleic acid, itaconic acid, isophthalic acid, terephthalic acid, etc. The polyhydric alcohols which may be used in the preparation of the alkyd resin may include the glycols, such as ethylene glycol, propylene glycol, etc., glycerine, sorbitol, erythritol, pentaerythritol, and the like. Epoxy resins may also be used as the film-forming polymer. Epoxy resins include the condensation products of bisphenol and epichlorohydrin, epoxylated drying oils, and glycidol ether of glycerol, epoxylated novolac resins, etc. Phenolic resins, such as obtained by the reaction of phenol and formaldehyde, may also be used.

The film-forming polymeric material may also be an aminoplast derived from the reaction of a compound containing a plurality of —$NH_2$ groups (e.g., urea, melamine, guanamine or benzoguanamine) with an aldehyde or a substance acting as an aldehyde (e.g., formaldehyde, benzaldehyde or paraformaldehyde).

A preferred group of film-forming materials which may be used in preparing these films are carboxylic acid amide interpolymers of the type disclosed in U. S. Pat. Nos. 3,037,963 and 3,118,853, the disclosures of which are incorporated herein by reference. These interpolymers are prepared by forming an interpolymer of an unsaturated carboxylic acid amide, such as acrylamide or methacrylamide, with at least one other polymerizable ethylenically unsaturated monomer, and then reacting the interpolymer with an aldehyde, such as formaldehyde, in the presence of an alcohol, such as butanol.

Aldehyde-modified and etherified amide interpolymers can also be produced by first reacting the unsaturated amide with an aldehyde and, if desired, an alcohol, to form an N-alkylol or an N-alkoxyalkyl-substituted amide. The N-substituted amide then is interpolymerized with the other monomer or monomers as described above, thereby producing interpolymers having the aforesaid recurrent groups without the need for further reaction. Such a method utilizing N-alkoxyalkyl substituted amides is described in U. S. Pat. No. 3,079,434.

Advantageous properties are often obtainable by employing mixtures of the above amide interpolymer resins with other resinous materials, such as many of those mentioned herein. For example, nitrocellulose, polyethylene, alkyd resins, epoxy resins, aminoplast resins, and others can be utilized for this purpose.

Another preferred group of film-forming materials which may be used in the films described are interpolymers of hydroxyl esters of unsaturated acids with at least one other polymerizable ethylenically unsaturated monomer. Such interpolymers are prepared by interpolymerizing a mixture of monomers comprising at least two percent by weight of a hydroxyalkyl ester of an ethylenically unsaturated carboxylic acid and at least one other ethylenically unsaturated monomer copolymerizable therewith. In many cases, more than one hydroxyalkyl ester is included in the interpolymer, and generally several monomers in addition to the hydroxyalkyl ester or esters are employed. These interpolymers are produced in a manner well-known in the art, using conventional procedures utilizing catalysts well-known in the art.

Preferred monomer systems used to produce these interpolymers are those containing hydroxyalkyl esters in which the alkyl group has up to about 12 carbon atoms. Especially preferred esters are acrylic acid and methacrylic acid esters of glycol and 1,2-propylene glycol, i.e., hydroxyethyl acrylate and methacrylate, and hydroxypropyl acrylate and methacrylate.

Films and coatings are usually produced from the above interpolymers of hydroxyalkyl esters by crosslinking these interpolymers with another material containing functional groups reactive with the hydroxyl group of the interpolymer. Examples of such coreactive materials include polyisocyanates, such as toluene diisocyanate and isocyanato-containing polymeric products, aminoplast resins, such as hexa(methoxymethyl)-melamine and others described above; epoxy resins, such as polyglycidyl ethers of Bisphenol A, and others, e.g., silicone resins.

Natural occurring polymeric materials which may be used in the films described include casein, shellac and gelatin.

The film-forming polymeric materials may be added to and dissolved in the solvent system as such. Alternatively, the corresponding monomer or monomers may be added to the solvent system and the film-forming polymeric material then formed in situ by polymerizing the monomers in the solvent system. Polymerization catalysts, such as organic peroxides, and polymerization modifiers such as tertiary dodecyl mercaptan and carbon tetrachloride may be employed in accordance with well-known techniques. If the system contains a polymer containing free hydroxyl groups, a crosslinking agent, such as an organic diisocyanate or a conventional aminoplast may be employed. Ethylenically unsaturated monomers may be polymerized in the solvent system in the presence of a preformed polymer, in which case there may occur either graft polymerization of the monomer on the preformed polymer, or if the preformed polymer contains ethylenic unsaturation, crosslinking of the preformed polymer.

The solvent system which is used in producing the films described comprises a mixture of at least two miscible liquids. It is not necessary that any of the liquids used in the solvent system taken individually be a solvent for the film-forming polymer so long as the polymer is soluble in them in admixture. At least one of the liquids in the solvent system, however, must be a non-solvent for the polymer and this liquid must have a substantially lower volatility than that of other liquids in the solvent mixture.

As used herein, the term "non-solvent" is used to denote a liquid in which the polymer does not dissolve to any appreciable extent.

The amount of the low volatility non-solvent liquid present in the solvent system must be enough to produce, upon the removal of the solvent mixture from a film formed from the composition, an open-celled film having a Kubelka-Munk scattering coefficient greater than 0.5 reciprocal mils at 5600 angstroms. However, the amount of low volatility non-solvent present in the solvent system must be less than that which, upon the removal of the solvent mixture from a film formed from the compotion, would produce a particulate film, i.e., a film of non-connected particles as contrasted with a discontinuous film containing interconnected cells.

When these requirements are met and a film is formed from the composition, the more volatile liquid evaporates at a greater rate than the low volatility non-solvent. After a portion of the solvent mixture has evaporated, the film-forming polymer gels and thereafter, the low volatility non-solvent liquid precipitates a separate phase in the polymer matrix which forms a rigid structure. Subsequently, the low volatility non-solvent evaporates, leaving interconnected microscopic voids in the rigid structure. These microscopic voids cause light scattering and opacity and result in the film being microporous and having a Kubelka-Munk scattering coefficient as previously defined.

The relationship of the amounts of the miscible liquids which comprise the solvent mixture may best be understood by plotting the actual composition of a three component system on a triangular phase diagram. The composition of such an actual system is illustrated in FIG. 1 wherein the concentration of the higher volatility liquid, methyl ethyl ketone (MEK) is calculated from apex G; the concentration of the lower volatility non-solvent for the polymer, hi flash aromatic naphtha (HFAN) is calculated from apex A; and the concentration of the film-forming, gelable polymer, a copolymer containing 90 percent methyl methacrylate and 10 percent methacrylic acid ($MMA\text{-}MAA_c$), is calculated from apex M. The line E-B is the gel structure line, the line C-A is the precipitation line, the region B-C is a region which is physically intermittent to these two. All compositions within the area GEA contain the polymer in the liquid phase. All compositions outside this region contain the polymer in a gel stage. Films having compositions along line E-F upon removal of all solvent are continuous and have Kubelka-Munk scattering coefficients less than 0.5 reciprocal mil at 4400 angstroms and less than 0.1 reciprocal mil at 5600 angstroms.

Films having composition along the line F-B upon removal of all solvent are continuous and contain minute closed cell voids. Films having compositions along the line B-C are films which may be utilized within the scope of this invention, that is, films which contain substantially interconnected voids, or, expressed differently, films which are discontinuous but not particulate. All the films along the line F-C upon removal of all solvent have Kubelka-Munk scattering coefficients greater than 0.5 reciprocal mil at 4400 angstroms and greater than 0.1 reciprocal mil at 5600 angstroms. Films along the line C-A are discontinuous particulate films, that is, films which on a surface show distinct areas which are coated and uncoated.

The coating compositions of use in this invention are those within the area B-G-C.

Thus a composition represented by point H will dry as an opaque discontinuous, open-celled film. While a composition represented by point I (area F-G-B) dries as an opaque, closed-celled film and a composition represented by point J (area E-G-F) dries as a transparent film. A composition at point K (area C-G-A) dries as a discontinuous particulate, possibly opaque film.

The films described may be further understood by reference to the generalized rectangular diagram shown in FIG. 2. This diagram shows four distinct zones which are dependent upon the concentration of the materials in the compositions. Coatings deposited from a composition which comes within zone A are continuous, transparent and for the most part non-porous. As the composition approaches the boundary of zone B, the coatings deposited exhibit a blush. Coatings produced from compositions falling within zone B are opaque, closed cell-containing coatings. The compositions in zone C dry as a polymer containing open cell-interconnected voids. The coatings of zone D dry as a precipitated, powdery, white, discontinuous film. Therefore the compositions used in this invention are those which fall within zone C and pass through line B-C upon removal of solvents. Lines G-B and G-C may be approximated by straight lines when the evaporation rate of the true solvent is much greater than that of the non-solvent.

The particular liquids which are used in the solvent mixture depend upon the particular film-forming polymer used. A liquid which is the more volatile component in one system may be the lower volatility non-solvent in a different system. Classes of liquids which may be employed include ketones, esters, alcohols, aliphatic, aromatic and chlorinated hydrocarbons and the like.

The compositions described may include other ingredients which will not interfere with the relationship between the film-forming, gelable polymer and the solvent mixture containing at least two miscible liquids. Thus, one or more additional polymers may be included to modify the properties of the final film, which polymers need not have the aforedescribed solubility properties relative to the solvent system, i.e., they need not be insoluble in the lower volatility liquid. If it is desired to obtain a film having a color other than white, colored pigments or dyes may be included in the composition. Likewise, rust or corrosion-inhibitive pigments may be incorporated, if desired.

The films described may be formed into a film by techniques well-known in the art. Thus, they may be coated onto a substrate by brushing, spraying, dipping, rolling, knife coating or calendering.

Films formed from the compositions described may be air-dried, vacuum dried or baked at elevated temperatures.

The films described are characterized by the presence therein of a large number of interconnected open cells or breaks. These cells or voids may be less than one micron or even 0.5 micron in size, although they may also be larger.

Another preferred method for preparing base coatings or films, which may be employed in compositions of this invention comprises producing a continuous opaque film containing interconnected voids by applying as a film to a substrate a composition comprising (a) a thermosetting resin and (b) a solvent-extractable thermoplastic resin, which resins are at least partially compatible, and subsequently curing the thermosetting resin, such as by heating. Upon curing of the thermosetting resin, the thermoplastic resin forms minute, discrete particles in the thermoset resin matrix. The thermoplastic resin is then extracted from the film, such as by means of a suitable solvent for the thermoplastic. There is thus obtained an opaque film of the thermoset resin. The film is continuous and contains a large number of voids. The coating composition of this case are described in copending application Ser. No. 557,578, filed June 14, 1966, now U.S. Pat. No. 3,544,482, which application is incorporated by reference.

The thermosetting resins which may be used in the practice of this type of film are well-known in the art. Such resins are curable to a crosslinked thermoset condition by the use of either heat and/or a curing catalyst.

One preferred group of thermosetting resins which may be used in the practice of this invention are admixtures of interpolymers of hydroxyl esters of ethylenically unsaturated acids with at least one other polymerizable ethylenically unsaturated monomer and a cross-linking agent therefore, such as an aminoplast resin. Interpolymers of hydroxyl esters of unsaturated acids with at least one other polymerizable ethylenically unsaturated monomer are prepared by interpolymerizing a mixture of monomers comprising at least two percent by weight of a hydroxyalkyl ester of an ethylenically unsaturated carboxylic acid and at least one other ethylenically unsaturated monomer copolymerizable therewith. In many cases, more than one hydroxyalkyl ester is included in the interpolymer, and generally several monomers in addition to the hydroxyalkyl ester or esters are employed. These interpolymers are produced in a manner well-known in the art, using conventional procedures utilizing catalysts well-known in the art. Free radical producing catalysts are commonly used but catalyst systems which function through other mechanisms can also be employed. The conditions of time, temperature and the like at which these interpolymerizations are carried out are also conventional and depend in large part upon the particular catalyst employed.

Preferred monomer systems used to produce these interpolymers are those containing hydroxyalkyl esters in which the alkyl group has up to about 12 carbon atoms. Especially preferred esters are hydroxyethyl acrylate and methacrylate, and hydroxypropyl acrylate and methacrylate. Combinations of these esters are also widely used; however there may also be employed similar esters of other unsaturated acid.

In addition to esters of unsaturated monocarboxylic acids, there may be employed the mono- or diesters of unsaturated dicarboxylic acids, such as maleic acid, fumaric acid and itaconic acid, in which at least one of the esterifying groups is hydroxyalkyl.

The monomer or monomers with which the hydroxyalkyl ester is interpolymerized can be any ethylenic compound copolymerizable with the ester, the polymerization taking place through the ethylenically unsaturated linkages. These include monoolefinic and diolefinic hydrocarbons, halogenated monoolefinic and diolefinic hydrocarbons, unsaturated esters of organic and inorganic acids, esters of unsaturated acids, nitriles, unsaturated acids, and the like.

The most useful interpolymers of this type are produced from the interpolymerization of one or more hydroxyalkyl esters with one or more alkyl esters of ethylenically unsaturated carboxylic acids or a vinyl aromatic hydrocarbon, or both. Among these preferred comonomers are the ethyl, methyl, propyl, butyl, hexyl, ethylhexyl and lauryl acrylates and methacrylates, as well as similar esters having up to about 20 carbon atoms in the alkyl group. Among the vinyl aromatic hydrocarbons generally utilized are styrene and alpha-alkyl styrene or vinyl toluene. The preferred monomer systems may include an ethylenically unsaturated nitrile, such as acrylonitrile or methacrylonitrile, and in many instances an ethylenically unsaturated carboxylic acid is present, of which the preferred are acrylic acid and methacrylic acid. The specific comonomers most often employed are methyl methacrylate, ethyl methacrylate, styrene, vinyl toluene, acrylonitrile, methacrylonitrile, methacrylic acid, acrylic acid, 2-ethylhexyl acrylate, butyl acrylate, butyl methacrylate and lauryl methacrylate.

Examples of catalysts ordinarily used in the interpolymerization include peroxygen compounds such as benzoyl peroxide, cumene hydroperoxide, hydrogen peroxide, and t-butylperoxy isopropyl carbonate, and azo compounds such as alpha, alpha-azobis(isobutyronitrile) and p-methoxyphenyl diazothio(2-naphthyl)ether.

Crosslinking agents for interpolymers of hydroxyalkyl esters are materials which contain functional groups reactive with the hydroxyl groups of the interpolymer. Examples of such coreactive materials include polyisocyanates, such as toluene diisocyanate and isocyanato-containing polymeric products; aminoplast resins, such as hexa(methoxymethyl)melamine and others described hereinafter; epoxy resins, such as polyglycidyl ethers of Bisphenol A; and others, e.g., silicone resins.

Another preferred group of thermosetting resins which may be used in the practice of this invention are admixtures of alkyd resins and crosslinking agents therefor such as aminoplast resins. Alkyd resins are obtained by the condensation of a polyhydric alcohol and a polycarboxylic acid.

In forming the alkyd resin which can be used in admixture with an aminoplast resin, various polyols can be used. These include glycerol, pentaerythritol, dipentaerythritol, mannitol, sorbitol, trimethylolethane, trimethylolpropane, 1,3,6-hexanetriol, and others, these are usually employed in amounts approximating, or somewhat exceeding, equivalency with respect to the acid component.

Usually the acid component comprises a mixture of dibasic and monobasic acids. The dibasic acids are represented by such dicarbaxylic acids as phthalic acid, isophthalic acid, terephthalic acid, tetrachlorophthalic acid, tetrabromophthalic acid, carbic acid (i.e., the reaction product of maleic acid and cyclopentadiene), chlorendic acid, fumaric acid, maleic acid, itaconic acid, adipic acid and sebacic acid, or combinations of these acids. The term "acid" also includes the anhydrides thereof, where they exist.

It is preferable to include a substantial amount of a monocarboxylic acid in the alkyd resin. Appropriate monocarboxylic acids comprise saturated aliphatic acids containing about eight to about 18 carbon atoms. Usually two types of acids (dicarboxylic acid and monocarboxylic acid) are employed in about equimolar amounts, but these ratios can be varied if desired. Monocarboxylic acids low in or free of functional unsaturation, such as ethylenic groups, are presently preferred. The use of such acids results in the production of non-oxidizing oil modified alkyds. Pure acids or mixtures of two or more thereof with each other may be employed. Such mixtures of monobasic acids as are obtained from natural sources, such as fatty acid glycerides are examples of useful mixtures of useful acids.

Mixtures of aliphatic monocarboxylic acids, such as coconut oil acids, and about 5 to 30 percent by weight of an aromatic monocarboxylic acid, such as benzoic acid, may be used as the monocarboxylic acid component of the resin.

The fatty acids need not necessarily be employed as free acids, but may be employed as partial esters of a polyol such as glycerol, pentaerythritol, or other polyhydric alcohol averaging about two available hydroxyl groups per molecule.

The sums of the acids usually are employed in slightly less (e.g., 1 to 10 molar percent) than molar equivalency with respect to the polyhydric alcohol. The two types of acids (dicarboxylic and monocarboxylic) are also most often employed in approximately equal moles. However, variations in this respect are also contemplated. The range may be, for example, about 30 to 70 molar percent of one of the said acids, the remainder being the other.

Further details for the preparation of alkyd resins are described in the book entitled "Organic Coating Technology", Vol. I, by Henry F. Payne, published by John Wiley & Sons (1954), Chapter 7.

Crosslinking agents for the alkyd resins include those materials which contain functional groups reactive with the hydroxyl groups of the alkyd, examples of which have been previously described in relation to crosslinking agents for interpolymers of hydroxyalkyl esters. The preferred cross-linking agents are aminoplast resins which will be more fully described hereinafter. Various proportions of alkyd resin and aminoplast resin crosslinking agent may be employed as the thermosetting resin component of this invention. For example, the aminoplast resin may constitute from about 5 to about 50 percent by weight of the mixture of the two resins, although this ratio is not critical. The blend of the alkyd resin and the aminoplast resin may also include various added vehicular agents such as plasticizers represented by epoxidized oils, so-called chemical plasticizers such as triphenyl phosphate, tricresyl phosphate, dicyclohexyl phthalate, butylbenzyl phthalate and others.

Aminoplast resins which are preferred crosslinking agents for interpolymers of hydroxyl esters of unsaturated acids and for alkyd resins are derived from the reaction of a compound containing a plurality of $-NH_2$ groups (e.g., urea, melamine, acetoguanamine or benzoguanamine) with an aldehyde or a substance acting as an aldehyde (e.g., formaldehyde). In preparing aminoplasts, the aldehyde or its equivalent is usually dissolved in an alkanol, such as butyl alcohol. Butanol may be replaced by other monohydric aliphatic alcohols containing from about one to about eight carbon atoms and being represented by methyl alcohol, ethyl alcohol, propyl alcohol, isopropyl alcohol, butyl alcohol, isobutyl alcohol, pentyl alcohol, hexyl alcohol and octyl alcohol. All of these are primary or secondary alcohols. Such resins contain $$-N-CH_2OH \text{ groups and } -N-CH_2O\text{-alkyl groups,}$$

wherein the moiety designated as "alkyl" ordinarily contains from three to eight carbon atoms. It is preferred that the alkyl groups be butyl, i.e., that the curing agent be a butylated aminoplast.

Further information as to the preparation and characteristics of aminoplast resins are contained in the aforementioned book entitled "Organic Coating Technology", Chapter 8, pages 326 to 350.

Thermosetting resin compositions comprising mixtures of an interpolymer of a hydroxyalkyl ester and an aminoplast resin are further described in U. S. Pat. No. 2,681,897; and further details for the preparation of aminoplast resins and alkyd resins which may be employed are described in U. S. Pat. No. 3,113,117.

Another group of thermosetting resins which may be used are carboxylic acid amide interpolymers of the type disclosed in U. S. Pat. Nos. 3,037,963 and 3,118,853. These interpolymers are prepared by forming an interpolymer of an unsaturated carboxylic acid amide, such as acrylamide or methacrylamide, with at least one other polymerizable ethylenically unsaturated monomer, and then reacting the interpolymer with an aldehyde, such as formaldehyde, in the presence of an alcohol, such as butanol.

It is desirable that at least about 50 percent of the methylol groups be etherified since compositions having less than about 50 percent of the methylol groups esterified will tend to be unstable and subject to gelation. Butanol is the preferred alcohol for use in the etherification process, although any alcohol containing up to about 20 carbon atoms may also be employed.

Any copolymerizable monomeric compound containing at least one

group may be polymerized with the unsaturated carboxylic acid amide.

The preparation of the amide interpolymer is described in detail in U. S. Pat. Nos. 2,870,116 and 2,870,117.

Aldehyde modified and etherified amide interpolymers can also be produced by first reacting the unsaturated amide with an aldehyde and, if desired, an alcohol, to form an N-alkylol or an N-alkoxyalkyl-substituted amide. The N-substituted amide is then interpolymerized with the other monomer or monomers as described above, thereby producing interpolymers having the aforesaid recurrent groups without the need for further reaction. Such a method utilizing N-alkoxyalkyl substituted amides is described in U. S. Pat. No. 3,079,434.

Other thermosetting resin compositions which may be used in conjunction with a solvent extractible thermoplastic resin which is at least partially compatible therewith and which will form minute discrete particles in the thermoset resin matrix when the thermosetting resin composition is cured include ethylenically unsaturated polyester resins obtained by the condensation of a glycol, such as ethylene glycol, propylene glycol, etc., and a polycarboxylic acid, such as maleic acid, fumaric acid, etc., in combination with a vinylidene monomer such as styrene, vinyl toluene, etc.; and epoxy resins such as obtained by the combination of bis-phenol and epichlorohydrin (e.g., Epon resins) in combination with a curing catalyst such as a polyamine (e.g., ethylene diamine).

Mixtures of two or more thermosetting resins may also be employed.

The thermoplastic resins which may be employed in the practice of the method described are well-known in the art. The only limitation on the selection of thermoplastic resin to be used in a particular system is that it must be at least partially compatible with the particular thermosetting resin with which it is used before the thermosetting resin with which it is used before the thermosetting resin is cured; it must form minute discrete particles in the thermoset resin matrix upon curing of the thermosetting resin composition; and it must be solvent-extractable.

For the purpose of this process, resins are considered to be at least partially compatible when they are capable of being admixed to form a homogeneous composition which does not readily separate into distinct phases of its component parts.

Examples of thermoplastic resins which may be used include cellulose derivatives (e.g., ethyl cellulose, nitrocellulose, cellulose acetate, cellulose propionate and cellulose acetate butyrate), acrylic resins (e.g., homopolymers and copolymers with each other or with other monomers of methyl acrylate, methyl methacrylate, ethyl acrylate, ethyl methacrylate, butyl acrylate, butyl methacrylate, acrylic acid and methacrylic acid); polyolefins (e.g., polyethylene and polypropylene); nylon; polycarbonates; polystyrene; copolymers of styrene and other vinyl monomers such as acrylonitrile; vinyl polymers such as homopolymers and copolymers of vinyl acetate, vinyl alcohol, vinyl chloride and vinyl butyral; homopolymers and copolymers of dienes such as polybutadiene, butadiene-styrene copolymers and butadiene-acrylonitrile copolymers.

A preferred group of thermoplastic polymers are copolymers of acrylates, such as 2-ethylhexyl acrylate and/or methacrylates, such as methyl methacrylate, with up to 50 percent of a comonomer such as dibutyl maleate or fumarate, butyl glycidyl maleate or fumarate and glycidyl methacrylate. These thermoplastic polymers may be dissolved in a solvent such as benzene, toluene, butanol, acetone or xylene when they are admixed with the thermosetting resin compositions.

Graft copolymers or block copolymers may also be used as the thermoplastic resin. Such copolymers possess segmental periodicity, i.e., they contain continuous sequences of one monomer that are not governed by statistical distribution. They may be formed by methods known in the art such as by polymerizing a vinylidene monomer in the presence of an appropriate preformed polymer and catalyst. Specific details for the preparation of graft copolymers are described, for example, in U. S. Pat. No. 3,232,903. The preformed polymer may be, for example, a polymeric ester of acrylic acid or methacrylic acid such as a copolymer of an ester of methacrylic acid or acrylic acid formed with an alcohol having four to 18 carbon atoms or of mixtures of such esters with esters of methacrylic acid or acrylic acid formed with alcohols having one to five carbon atoms. Mixtures of methacrylate and acrylate esters with from one percent by weight to 50 percent by weight of one or more monoethylenically unsaturated monomers copolymerizable therewith may also be used in the preapration of the preformed polymer.

Vinylidene monomers which may be polymerized in the presence of the preformed polymer include vinyl esters of fatty acids having from one to 18 carbon atoms such as acrylonitrile, methacrylonitrile, acrylamide, methacrylamide, styrene, a-methylstyrene, vinyl toluene, acrylic acid, acrylic acid anhydride, methacrylic acid, methacrylic acid anhydride, maleic anhydride, fumaric acid, crotonic acid, allyl acetate, glycidyl methacrylate, t-butylaminoethyl methacrylate, hydroxyalkyl acrylates or methacrylates such as β-hydroxyethyl methacrylate, β-hydroxyethyl vinyl ether, β-hydroxyethyl vinyl sulfide, vinyl pyrrolidone, N,N-dimethylaminoethyl methacrylate, ethylene, propylene, vinyl chloride, vinyl fluoride, vinylidene fluoride, hexafluoropropylene, chlorotrifluoroethylene, and tetrafluoroethylene.

The proportions of thermosetting resin and thermoplastic resin which are admixed are not critical and will vary depending on the particular resins used and on the properties desired in the resultant films, e.g., amount of opacity and/or porosity. Generally, from about 10 to about 200 parts by weight of the thermoplastic resin is employed for every 100 parts by weight of thermosetting resin used.

The thermosetting resin and the thermoplastic resin may be admixed by forming a homogeneous solution of dispersion of the resins in a liquid medium. Solvents which are suitable for use with interpolymers of hydroxyl esters of unsaturated acids and an aminoplast resin include xylene, benzene, toluene, amyl acetate, butyl acetate, butyl propionate, dibutyl phthalate, diethyl phthalate, ethylene glycol, diethyl ether, ethyl phenyl ether, diphenyl ether, butyl benzyl ether, etc. When the thermosetting resin composition comprises an alkyd resin and an aminoplast resin, suitable solvents include alcohols containing from about three to eight carbon atoms such as propyl alcohol, isopropyl alcohol, butyl alcohol, amyl alcohol, nonyl alcohol, octyl alcohol, etc.; aromatic hydrocarbons such as xylene or toluene; ketones such as methyl ethyl ketone, methyl isobutyl ketone, cyclohexanone, isophorone, etc.; esters such as isopropyl acetate, butyl acetate, amyl acetate, nonyl acetate, phosphates such as tributyl phosphate; and chlorinated hydrocarbons such as methylene chloride.

In the preferred embodiment of this described process, both the thermoplastic and the thermosetting resin are in solution. Under proper conditions, one resin may be in solution and the other may be present in the form of a dispersion; or both resins may be present in the form of a dispersion.

The composition described may also include other ingredients such as plasticizers, etc. If it is desired to obtain a film having a color other than white, colored pigments or dyes may be included in the composition.

When the thermoplastic and thermosetting resins have been admixed in a liquid vehicle, either in dispersion or solution, the homogeneous mixture is applied to a substrate as a film by techniques well-known in the art. Thus, it may be coated onto a substrate by brushing, spraying, dipping, roller coating, knife coating or calendering.

The film may be air dried for a time to remove a portion of the liquid vehicle and it is then cured as by baking to crosslink the thermosetting resin. This process results in at least a portion of the thermoplastic resin forming minute, discrete particles in the thermoset resin matrix in the form of globules and/or threads due to its reduced compatibility with the thermoset resin. Some portion of the thermoplastic resin may not separate as discrete particles when the thermosetting resin is cured, i.e., it may remain compatible with and be incorporated into the thermoset resin matrix and act as a plasticizer therefor.

The temperature required to effect a cure of the thermosetting resin will depend upon the particular resin employed. For example, when the thermosetting resin component is an admixture of an interpolymer of a hydroxyl ester of an unsaturated acid with at least one other monomer and an aminoplast resin, curing temperatures of from 250°F. to 350°F. may be used. However, when the thermosetting resin is a carboxylic acid amide interpolymer of the type previously described, higher cure temperatures are required.

After curing, the thermoplastic resin is leached out or extracted from the film by contacting the film with a suitable solvent for the thermoplastic resin such as by immersion. The length of time the coating is contacted with the solvent is not critical so long as it is sufficient to extract the thermoplastic resin. It is preferred that at least about 75 percent by weight of the thermoplastic resin content present in the matrix be extracted. It is also preferred that the amount of thermoplastic resin which is extracted be at least about 10 percent by total weight of the film before extraction. Generally the film is contacted with the solvent for about one to 20 minutes and, preferably, for about two minutes at room temperature. The film is then dried to remove the residual solvent. There remains an opaque, microporous film of the thermoset resin.

The thermoplastic resin which is extracted from the film may be recovered from the extract thereof by known techniques, such as by evaporation of the solvent, and recycled for reuse. The solvent extract may also be recovered for reuse in the process.

Instead of mixing the thermosetting and thermoplastic resins together in a liquid vehicle, a homogeneous mixture of finely divided particles of the two resins may be prepared. This mixture may be applied as a powder coating to a substrate. The mixture of powdered resins is then heated to form a melt of the two resins and to cure the thermosetting resin. The minute, discrete particles of thermoplastic resin which are thereby formed in the thermoset resin matrix are then extracted therefrom as previously described to obtain an opaque, microporous film.

The films produced by the process described are characterized by the presence therein of a large number of minute, discrete voids and by being of very high reflectivity and a substantially pure white (if no dye or colored pigment has been included). Their extreme whiteness makes them useful as white reflectance standards. The voids in the film may be substantially globular in shape or threadlike (i.e., have substantially greater length than diameter). The average diameter of the voids is generally less than about 1.0 micron, preferably less than about 1/20th micron. The lengths of the threadlike voids are generally of the same order of magnitude as the thickness of the film.

Preferably the primer or base coat has a thickness of 0.01 mils up to about five mils, although the thickness of the base or primer coating is limited only by its ability to accept an electrocoat and is ultimately dependent on the degree of porosity and water permeability.

After the base or primer coating has been formed on a conductive substrate, for example, in the various manners described hereinabove, the article thus formed is subjected to electrodeposition in any art-recognized manner.

In the electrodeposition process, the article to be coated serves as an electrode in electrical contact with a counter-electrode and an electrodepositable composition comprising an aqueous dispersion of an ionically solubilized film-forming material such as a synthetic organic resin. Generally the solubilized resin is contained in an electrodeposition bath in which the article to be coated and the counter-electrode are immersed. An electtic current, usually direct current, is passed between the article to be coated and the counter-electrode to cause electrodeposition of a coating of the electrodepositable composition on the article. The articles are then withdrawn from the bath, usually rinsed and then the coating either air dried or baked in the manner of a conventional finish.

Electrodepositable compositions, while referred to as "solubilized", in fact are considered a complex solution, dispersion or suspension, or combination of one or more of these classes in water, which acts as an electrolyte under the influence of an electric current. While no doubt in some instances the vehicle resin is in solution, it is clear that in some instances, and perhaps in most, the vehicle resin is a dispersion which may be called a molecular dispersion of molecular size between a colloidal suspension and a true solution.

While the electrodepositable composition may essentially be the solubilized resin, frequently industrial electrodepositable compositions also contain pigments, crosslinking resins and other adjuvants.

A number of electrodepositable resins are known and can be employed to provide the electrodepositable compositions which may be utilized within the scope of this invention. Virtually any water-soluble, water-dispersible or water-emulsifiable polyacid or polybasic resinous material can be electrodeposited and, if film-forming, provides coatings which may be suitable for certain purposes. Any such electrodepositable composition is included among those which can be employed in the present invention even though the coating obtained might not be entirely satisfactory for certain specialized uses. Many examples of such materials may be readily found by referring to U. S. Patent Office Class 204, sub-class 181.

Presently, the most widely used electrodepositable vehicle resins are synthetic polycarboxylic acid resinous materials. Numerous such resins and formulations and formulation techniques are described in U. S. Pat. Nos. 3,441,489; 3,422,044; 3,403,088; 3,369,983 and 3,366,563, which are incorporated by reference.

Other base-solubilized polyacids which may be employed as electrodepositable resins include those taught by U. S. Pat. No. 3,392,165, which is incorporated herein by reference.

The process of the instant invention is equally applicable to cationic type vehicle resins, that is, polybases, such as nitrogeneous resin which are soluble per se or polybases which are acid solubilized, for example, an amine-terminated polyamide or an acrylic polymer solubilized with acetic or formic acids. Other cationic electrodepositable polymers are described in copending application Ser. No. 772,366, filed Oct. 28, 1968.

The polyacids are anionic in nature and are dispersed or dissolved in water with alkaline materials such as amines or alkaline metal hydroxides and when subjected to an electric current they migrate and coat upon the anode. The polybasic resins, soluble per se or with an acid, are cationic in character and migrate and coat upon the cathode.

The invention is further described in conjunction with the following example, which is considered illustrative rather than limiting. All parts and percentages are by weight unless otherwise specified.

EXAMPLE I

A solution was formed by mixing the following:

| | Parts by Weight |
|---|---|
| Methyl ethyl ketone | 357 |
| Butanol | 200 |
| Cellulose acetate butyrate (Containing 17 percent butyryl groups, 29 percent acetyl groups and 1.5 percent hydroxyl groups; viscosity 31–51 sec., 56–131 poises) | 25 |
| Cellulose acetate butyrate (Containing 26 percent butyryl groups, 20 percent acetyl groups and 2.5 percent hydroxyl groups; viscosity 15–35 sec., 56–131 poises) | 25 |
| Acrylic polymer (91.25 percent methyl methacrylate, 2.5 percent methacrylic acid, 4.25 percent hydroxyethyl methacrylate, 2 percent acrylamide—the acid groups being reacted with ethylene imine to yield amino ethyl ester termination, at 40.1 percent solids in 73 percent toluene, 21.5 percent butanol and 5.5 percent xylene.) | 175 |
| Butylated melamine formaldehyde resin (50 percent solids in 80 percent butanol, 20 percent xylene) | 58 |
| Epon 1001 | 10 |
| Aromatic high flash naphtha (Solvesso 150) | 175 |

To 100 parts of the above solution were added three parts of 10 percent phosphoric acid solution and 5 parts of aromatic high flash naphtha (Solvesso 150).

This composition was then applied to a phosphatized steel panel employing a 0.010 wire wound draw bar and baked 1.5 minutes at 350°F. The dry film thickness was 0.1 mil. This panel was then electrocoated.

The electrodepositable composition was based on the following resin composition:

| | Parts by Weight |
|---|---|
| Hydroxyethyl methacrylate | 9.0 |
| Methacrylic acid | 5.0 |
| Styrene | 27.5 |
| Ethyl acrylate | 40.0 |
| 2-ethylhexyl acrylate | 18.5 |

The polymer was utilized as an 82 percent solids solution in 50/50 Cellosolve (monoethyl ether of ethylene glycol) and Solvesso 150 (aromatic high flash naphtha) with a Gardner-Holdt viscosity Z9–Z10 and an acid value of 25.0.

The electrodepositable composition had the following formulation:

| | Parts by Weight |
|---|---|
| Acrylic resin (above) | 236.8 |
| Triethylamine | 13.5 |
| TiO$_2$ | 84.2 |
| Dispersing agent (Witco 912) | 0.8 |
| Hexamethoxymethyl melamine | 84.2 |
| Deionized water | 3229.7 |

The steel panel primed as above was electrocoated in a bath of the above composition (bath temperature of 78°F.) at 150 volts for 90 seconds. The resulting uniform coating was baked at 400°F. for 10 minutes. The resultant dry film thickness was 0.5–0.6 mil.

Other interconnected, open-cell containing coatings, such as those described hereinabove can be substituted for that exemplified and equivalent results obtained. Likewise, other electrodepositable compositions, such as those hereinabove described may replace that specifically utilized and equivalent results obtained with the scope of the invention as described.

According to the provisions of the Patent Statutes, there are described above the invention and what are now considered its best embodiments; however, within the scope of the appended claims, it is to be understood that the invention can be practiced otherwise than as specifically described.

I claim:

1. In a method of electrocoating comprising coating an electrode in electrical contact with a counter-electrode and an aqueous medium comprising an ionically solubilized synthetic organic resin by passing an electric current between the electrodes, thereby depositing a continuous coating upon said electrode, the improvement which comprises employing as the electrode to be coated an electrically conductive surface having an adherent coating of a primer comprising an open cell containing, water permeable, continuous film of an inherently non-conductive organic polymeric material, said film being capable of passing an electric current when in contact with an aqueous electrolyte, said primer coating having been formed by
   a. applying to said electrically conductive surface a composition comprising a film-forming material containing at least one film forming gelable polymer, and
   a solvent mixture for said film-forming material comprising at least two miscible liquids, at least one of said liquids being a non-solvent for said polymer and having a lower volatility than that of the other liquids in said mixture, said solvent mixture and said polymer forming a single phase,
   the amount of said lower volatility non-solvent liquid present in said mixture being at least enough to produce, upon removal of said solvent mixture from said composition, an open, interconnected, cell containing film and less than that which upon removal of said solvent mixture from said composition produces a discontinuous, particulate film, and
   b. removing said solvent mixture from said composition to provide said adherent primer coating comprising an open cell containing, water permeable continuous film.

2. A method as in claim 1 wherein the primer coating contains at least about 10 percent void volume.

3. In a method of electrocoating comprising coating an electrode in electrical contact with a counter-electrode and an aqueous medium comprising an ionically solubilized synthetic organic resin by passing an electric current between the electrodes, thereby depositing a continuous coating upon said electrode, the improvement which comprises employing as the electrode to be coated an electrically conductive surface having an adherent coating of a primer comprising an open cell containing, water permeable, continuous film of an inherently non-conductive organic polymeric material, said film being capable of passing an electric current when in contact with an aqueous electrolyte, said primer coating having been formed by
   a. applying to said electrically conductive surface a composition comprising (1) a thermosetting resin and (2) a solvent-extractable thermoplastic resin, which resin are at least partially compatible and curing the thermosetting resin, thereby forming discrete particles of the thermoplastic resin in the thermoset resin matrix
   b. solvent extracting the thermoplastic polymer to provide said adherent primer coating comprising an open cell containing, water permeable, continuous film.

4. A method as in claim 3 wherein the primer coating contains at least about 10 percent void volume.

5. In a method of electrocoating comprising coating an electrode in electrical contact with a counter-electrode and an aqueous medium comprising an ionically solubilized synthetic organic resin by passing an electric current between the electrodes, thereby depositing a continuous coating upon said electrode, the improvement which comprises employing as the electrode to be coated an electrically conductive surface having an adherent coating of a primer comprising an open cell containing, water permeable, continuous film of an inherently non-conductive organic polymeric material, said film being capable of passing an electric current when in contact with an aqueous electrolyte, said primer coating having been formed by
   a. applying to said electrically conductive surface a composition comprising an aqueous dispersion of a polymer containing, based on the weight of the dispersion, from 10 to 50 percent of a water soluble organic solvent for the polymer, the solvent boiling above 100°C and being present in a concentration that is insufficient to dissolve the polymer
   b. removing a substantial amount of aqueous media by evaporation until the partial coalesence of the polymer occurs
   c. washing the resultant film with water to produce a coherent solvent free film
   d. drying the film at a temperature below the softening point of the film to provide said adherent primer coating comprising an open cell containing water permeable, continuous film.

6. In a method of electrocoating comprising coating an electrode in electrical contact with a counter-electrode and an aqueous medium comprising an ionically solubilized synthetic organic resin by passing an electric current between the electrodes, thereby depositing a continuous coating upon said electrode, the improvement which comprises employing as the electrode to be coated an electrically conductive surface having an adherent coating of a primer comprising an open cell containing, water permeable, continuous film of an inherently non-conductive organic polymeric material, said film being capable of passing an electric current when in contact with an aqueous electrolyte, said primer coating having been formed by
   a. applying to said electrically conductive surface a dispersion of a finely divided thermoplastic powder throughout a highly viscous inert incompatible medium maintained as a continuous phase
   b. fusing the thermoplastic particles
   c. leaching out the inert material without affecting the fused thermoplastic particles to provide said adherent primer coating comprising an open cell containing, water, permeable, continuous film.

7. In a method of electrocoating comprising coating an electrode in electrical contact with a counter-electrode an aqueous medium comprising an ionically solubilized synthetic organic resin by passing an electric current between the electrodes, thereby depositing a continuous coating upon said electrode, the improvement which comprises employing as the electrode to be coated an electrically conductive surface having an adherent coating of a primer comprising an open cell containing, water permeable, continuous film of an inherently non-conductive organic polymeric material, said film being capable of passing an electric current when in contact with an aqueous electrolyte, said primer coating having been formed by a. applying to said electrically conductive surface a layer of a solution of a polymer in an organic solvent
b. bathing the layer with a mixture of an organic solvent for the polymer and a non-solvent for the polymer that is at least partially miscible with said solvent until the layer is coagulated into a cellular structure of interconnecting microvoids
c. removing substantially all the solvent from the layer
d. removing substantially all the non-solvent from the resulting substantially solvent-free microporous layer to provide said adherent primer coating comprising an open cell containing, water permeable, continuous film.

8. In a method of electrocoating comprising coating an electrode in electrical contact with a counter-electrode and an aqueous medium comprising an ionically solubilized synthetic organic resin by passing an electric current between the electrodes thereby depositing a continuous coating upon said electrode, the improvement which comprises employing as the electrode to be coated an electrically conductive surface having an adherent coating of a primer comprising an open cell containing, water permeable, continuous film of an inherently non-conductive organic polymeric material, said film being capable of passing an electric current when in contact with an aqueous electrolyte, said primer coating having been formed by a. applying to said electrically conductive surface a coating composition comprising a film forming polymer and a non-solvent for said polymer, said non-solvent being of lower volatility than other liquids present in said coating composition, the amount of non-solvent present in the coating composition being sufficient to produce upon removal an open interconnected cell containing film having a Kubelka-Munk scatting coefficient greater than 0.5 reciprical mil at 4400 Angstroms and greater than 0.1 reciprocal mil at 5600 greater than 0.1 reciprocal mil at 5600 Angstroms and less than that which upon removal produces a disparticulate film b. forming a continuous polymer film containing said non-solvent c. removing said non-solvent to provide said adherent primer coating comprising an open cell containing, water permeable, continuous film.

9. A method as in claim 8 wherein the primer coating contains at least about 10 percent void volume.

* * * * *

UNITED STATES PATENT OFFICE
CERTIFICATE OF CORRECTION

Patent No. 3,770,604                    Dated    November 6, 1973

Inventor(s)    Jerome A. Seiner

It is certified that error appears in the above-identified patent and that said Letters Patent are hereby corrected as shown below:

Claim 6, last line thereof (Column 18, line 53) delete the comma (,) between "water" and "permeable". Claim 8 (Column 20, lines 15 and 16, delete "greater than 0.1 reciprocal mil at 5600".

Signed and sealed this 16th day of April 1974.

(SEAL)
Attest:

EDWARD M. FLETCHER, JR.                C. MARSHALL DANN
Attesting Officer                      Commissioner of Patents